(12) United States Patent
Doty et al.

(10) Patent No.: US 6,555,231 B2
(45) Date of Patent: Apr. 29, 2003

(54) WATERBORNE COATING COMPOSITION AND A PAINT SYSTEM THEREOF HAVING IMPROVED CHIP RESISTANCE

(75) Inventors: Robert Doty, League City, TX (US); Timothy P. Kandow, Howell, MI (US)

(73) Assignee: BASF Corporation, Southfield, MI (US)

( * ) Notice: Subject to any disclaimer, the term of this patent is extended or adjusted under 35 U.S.C. 154(b) by 30 days.

(21) Appl. No.: 09/898,320

(22) Filed: Jul. 3, 2001

(65) Prior Publication Data

US 2003/0012959 A1 Jan. 16, 2003

(51) Int. Cl.$^7$ ............................. B32B 27/40; C08L 75/04
(52) U.S. Cl. .................. 428/423.1; 428/423.3; 428/425.8; 524/591
(58) Field of Search ........................ 428/423.1, 425.8, 428/423.3; 524/591

(56) References Cited

U.S. PATENT DOCUMENTS

| | | | | |
|---|---|---|---|---|
| 4,933,237 A | * | 6/1990 | Krenceski et al. | 156/229 |
| 5,210,154 A | | 5/1993 | Weidemeier et al. | 525/438 |
| 5,280,062 A | | 1/1994 | Blum et al. | 524/591 |
| 5,589,228 A | | 12/1996 | Wegner et al. | 427/407.1 |
| 5,593,785 A | | 1/1997 | Mayo et al. | 428/423.1 |
| 5,635,251 A | | 6/1997 | Oda et al. | 427/407.1 |
| 5,968,655 A | | 10/1999 | Hartung et al. | 428/423.1 |
| 6,192,798 B1 | * | 2/2001 | Rorke et al. | 101/457 |
| 6,414,079 B1 | | 7/2002 | Schafheutle et al. | 524/589 |

FOREIGN PATENT DOCUMENTS

| | | | | |
|---|---|---|---|---|
| EP | 498 156 | 10/1992 | ........... | C08G/18/66 |
| EP | 590 484 | 9/1993 | ........... | C08G/18/08 |
| EP | 1 092 738 | 9/2000 | ........... | C08G/18/66 |

OTHER PUBLICATIONS

BASF Corporation, et al., International Search Report PCT/US02/14370, International Filing Date Jul. 5, 2002.

* cited by examiner

*Primary Examiner*—James J. Seidleck
*Assistant Examiner*—Melanie Bissett
(74) *Attorney, Agent, or Firm*—David M. LaPrairie

(57) ABSTRACT

An acrylic-free, waterborne coating composition is disclosed. The waterborne coating composition produces a waterborne paint film having improved chip resistance on a substrate. The waterborne coating composition comprises an aqueous polyurethane dispersion substantially free from co-solvents. The polyurethane dispersion has a glass transition temperature from 0° C. or less and at least one carboxyl group. The waterborne coating composition also includes a melamine reactive with the carboxyl group. The aqueous polyurethane dispersion and the water-soluble cross-linker form a binder component of the waterborne coating composition. The binder component includes from 60 to 90% by weight of the aqueous polyurethane dispersion based on 100% by weight of the binder component and from 10 to 40% by weight of the water-soluble cross-linker based on 100% by weight of the binder component. The waterborne coating composition is applied having a film build of 0.5 to 5.0 mils and produces a paint film loss of from 0.05 to 0.8% according to a Gravel Chip Test.

46 Claims, No Drawings

WATERBORNE COATING COMPOSITION AND A PAINT SYSTEM THEREOF HAVING IMPROVED CHIP RESISTANCE

FIELD OF THE INVENTION

The subject invention generally relates to an acrylic-free, waterborne coating composition for producing a waterborne paint film having improved chip resistance on a substrate. More specifically, the waterborne coating composition of the subject invention includes an aqueous polyurethane dispersion and a water-soluble cross-linker for producing the waterborne paint film to have improved chip resistance on the substrate of from 0.05 to 0.8 percent paint film loss according to a Gravel Chip Test.

BACKGROUND OF THE INVENTION

Waterborne coating compositions are known in the art. In both the refinish and original equipment manufacturer (OEM) coating industries, waterborne coating compositions are applied to a substrate, such as an automobile body, to produce a paint film on the substrate. Such paint films serve both functional and aesthetic purposes.

Many of these waterborne coating compositions incorporate polyurethane as a primary binder resin. To effectively disperse the polyurethane resin in water, the waterborne coating compositions incorporate a neutralizing agent such as an amine. Amines neutralize certain functional groups associated with the polyurethane to form salts of the polyurethane. The salts of the polyurethane promote dispersibility of the polyurethane in water. These polyurethanes are known in the art as amine dispersible polyurethane resins. Many of the prior art polyurethanes also include a third component, usually any epoxy or acrylic resin. The third component is typically utilized to increase a particular property of the waterborne coating composition such as adhesion, hardness, or appearance of the paint film.

More specifically, the waterborne coating compositions of the prior art have acrylic resin as the third component. The acrylic resin increases the hardness of the paint film produced by the waterborne coating composition upon the substrate. The disadvantage of utilizing acrylic resins is that the increased hardness of the paint film increases the amount of film loss due to chipping. If the waterborne coating composition is applied to an automotive body, the paint film will be subjected to extreme environmental chip conditions.

In sum, the waterborne coating compositions of the prior art are characterized by one or more inadequacies. Therefore, it is desirable to provide a novel waterborne coating composition that does not include acrylic resins and that produces an improved paint film having increased chip resistance.

SUMMARY OF THE INVENTION AND ADVANTAGES

An acrylic-free, waterborne coating composition is disclosed. The waterborne coating composition of the subject invention produces a waterborne paint film having improved chip resistance on a substrate. The waterborne coating composition includes an aqueous polyurethane dispersion substantially free from co-solvents. The aqueous polyurethane dispersion has carboxyl groups, and a glass transition temperature from 0° C. or less. The waterborne coating composition also includes a water-soluble cross-linker reactive with the carboxyl groups.

Together, the aqueous polyurethane dispersion and the water-soluble cross-linker form a binder component of the waterborne coating composition. The binder component includes from 60 to 90% by weight of the aqueous polyurethane dispersion based on 100% by weight of the binder component and from 10 to 40% by weight of the water-soluble cross-linker based on 100% by weight of the binder component.

The waterborne paint film produced by the waterborne coating composition of the subject invention exhibits improved resistance to chip. Furthermore, the waterborne paint film also exhibits improved resistance to chip as film build increases. Accordingly, the subject invention provides a novel acrylic-free waterborne coating composition utilizing an aqueous polyurethane dispersion and a water-soluble cross-linker. The subject invention also provides a layered paint system utilizing the novel acrylic-free waterborne coating composition.

DETAILED DESCRIPTION OF THE PREFERRED EMBODIMENT

A waterborne coating composition for producing a waterborne paint film having improved chip resistance on a substrate is disclosed. More specifically, the waterborne coating composition of the subject invention is acrylic-free and therefore does not include acrylic resins as a component of the waterborne coating composition. However, acrylic resins may be included in other layers applied to the substrate before or after the application of the waterborne coating composition. The waterborne coating composition includes an aqueous polyurethane dispersion and a water-soluble cross-linker.

The aqueous polyurethane dispersion is substantially free from co-solvents. It is to be understood that, in the context of the subject invention, substantially free of co-solvents is intended to indicate that the aqueous polyurethane dispersion has less than about 5% by weight of volatile organic solvents based on 100% by weight of the aqueous polyurethane dispersion. Preferably, the aqueous polyurethane dispersion has less than about 2.5% by weight of volatile organic solvents based on 100% by weight of the aqueous polyurethane dispersion. The waterborne coating composition is also free of polyesters in accordance with the above description of acrylic.

The aqueous polyurethane dispersion has at least one carboxyl group. The water-soluble cross-linker has at least one amine group that is reactive with the carboxyl group. As understood by those skilled in the art, the carboxyl group of the aqueous polyurethane dispersion cross-links with the amine group forming the waterborne paint film.

The aqueous polyurethane dispersion is prepared by reacting at least one polyisocyanate with at least one polyol. The reactants used to prepare the aqueous polyurethane dispersion are selected and apportioned to provide the desired glass transition temperature. Suitable polyisocyanates include, but are not limited to, aliphatic polyisocyanates, alicyclic polyisocyanates, and combinations thereof. Owing to their good resistance to ultraviolet light, aliphatic and alicyclic polyisocyanates produce paint films having a low tendency toward yellowing. This tendency is highly desirable, especially for use in automotive coatings. However, aromatic polyisocyanates may still be utilized to achieve the desired results of the subject invention.

Illustrative examples of polyisocyanates include, without limitation, isophorone diamine diisocyanate, ethylene diisocyanate, 1,2-diisocyanatopropane, 1,3- diisocyanatopropane, 1,4-butylene diisocyanate, lysine diisocyanate, 1,4-methylene bis(cyclohexyl isocyanate), toluene diisocyanates (e.g., 2,4-toluene diisocyanate and 2,6-toluene diisocyanate)diphenylmethane 4,4'-diisocyanate, methylenebis-4,4'-isocyanatocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and-1,4-diisocyanate, 1-isocyanato-2-isocyanatomethyl cyclopentane, bisphenylene diisocyanate, naphthylene diisocyanate, diphenylmethane diisocyanate, cyclobutane diisocyanate, cyclopentylene diisocyanate, cyclohexylene diisocyanate, pentamethylene diisocyanate, propylene diisocyanate, and combinations thereof. Biurets, allophonates, isocyanurates, carbodiimides, and other such modifications of these isocyanates can also be used as the polyisocyanates.

More highly functional polyisocyanates may also be used to form the polyisocyanate provided that this does not cause any gelling of the aqueous polyurethane dispersion and ultimately of the waterborne coating composition. One example of highly functional polyisocyanates are triisocyanates which are products formed by trimerization or oligomerization of diisocyanates or by reaction of diisocyanates with polyfunctional OH- or NH-containing compounds. The polyisocyanate has a functionality, which may be lowered by addition of monoisocyanates.

The polyol or polyols used to prepare the aqueous polyurethane dispersion can be selected from any of the polyols known to be useful in preparing aqueous polyurethane dispersions, including, but not limited to, 1,6-hexanediol, cyclopentanone, 1-hexen-6-ol, 1-dodecanol, isopropyl acetone, 1,4-butanediol, 1,3-butanediol, 2,3-butanediol, neopentyl glycol, 1,3-propanediol, 1,5-pentanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, thiodiglycol, 2,2,4-trimethyl-1,3-pentanediol, cyclohexanediols, trimethylolpropane, 1-hexen-6-ol, 1-dodecanol, trimethylolethane, and glycerin.

Suitable aqueous polyurethane dispersions can be prepared by any of the known methods. In one method for preparing aqueous polyurethane dispersions, the polyisocyanate component can be reacted with an excess of equivalents of the polyol component. Alternatively, an excess of equivalents of the polyisocyanate component can be reacted with the polyol component to form an isocyanate-functional prepolymer. The prepolymer can then be reacted further in different ways. First, the prepolymer can be reacted with a mono-functional alcohol or amine to provide a non-functional aqueous polyurethane dispersion. Examples of mono-functional alcohols and amines that may be used include polyethylene oxide compounds having one terminal hydroxyl group, lower mono-functional alcohols having up to 12 carbon atoms, amino alcohols such as dimethylethanolamine, and secondary amines such as diethylamine and dimethylamine. Secondly, the prepolymer can be reacted with a polyfunctional polyol, polyamine, or amino alcohol compound to provide reactive hydrogen functionality. Examples of such polyfunctional compounds include, but are not limited to, the polyols already mentioned above, including triols such as trimethylolpropane; polyamines such as ethylenediamine, butylamine, and propylamine; and amino alcohols, such as diethanolamine. Finally, the prepolymer can be chain extended by the water during emulsification or dispersion of the prepolymer in the aqueous medium. The prepolymer is mixed with the water after or during neutralization.

The aqueous polyurethane dispersion may be polymerized without solvent. Solvent may be included, however, if necessary, when the aqueous polyurethane dispersion or prepolymer product is of a high viscosity. If solvent is used, the solvent may be removed, partially or completely, by distillation, preferably after the aqueous polyurethane dispersion is dispersed in the water. The aqueous polyurethane dispersion may have nonionic hydrophilic groups, such as polyethylene oxide groups, that serve to stabilize the aqueous polyurethane dispersion. The aqueous polyurethane dispersion is prepared with pendant acid groups as described above, and the acid groups are partially or fully salted with an alkali, such as sodium or potassium, or with a base, such as an amine, before or during dispersion of the aqueous polyurethane dispersion or prepolymer in water.

The aqueous polyurethane dispersion and the water-soluble cross-linker form a binder component of the waterborne coating composition. The binder component includes from 60 to 90% by weight of the aqueous polyurethane dispersion based on 100% by weight of the binder component. The binder component also includes from 10 to 40% by weight of the water-soluble cross-linker based on 100% by weight of the binder component. Preferably, the binder component comprises 65 to 85% by weight of the aqueous polyurethane dispersion based on 100% by weight of the binder component and from 15 to 35% by weight of the water-soluble cross-linker based on 100% by weight of the binder component.

The aqueous polyurethane dispersion also has a glass transition temperature from 0° C. or less. Preferably, the glass transition temperature is from –80° C. to –20° C., more preferably, from –60° C. to –40° C. The aqueous polyurethane dispersion having the glass transition temperature within these ranges is suitable for producing the improved chip resistance described below. As the glass transition temperature of the aqueous polyurethane dispersion increases, the increased film loss due to chip of the waterborne paint film also increases.

The aqueous polyurethane dispersion includes a number-average molecular weight of from 1,000 to 40,000. Preferably, the number-average molecular weight is from 15,000 to 30,000, more preferably, from 19,000 to 28,000. The aqueous polyurethane dispersion includes an acid number of from 5 to 25 mg KOH/g. Preferably, the acid number is from 6 to 24 mg KOH/g, more preferably, from 9 to 19 mg KOH/g. The aqueous polyurethane has a softening point from 275° C. to 345° C. according to ASTM D6090-99. Preferably, the softening point is from 290° C. to 330° C., more preferably, from 305° C. to 315° C.

The aqueous polyurethane dispersion includes an ultimate tensile strength of greater than 6000 PSI. The ultimate tensile strength is reached when the sample breaks into two pieces. The ultimate tensile strength is measured by producing a sample of the aqueous polyurethane dispersion having a film build of 10 mils. The sample is then cured at 80° C. for thirty minutes followed by 150° C. for twenty minutes. The sample is cut into one-inch straight strips and put into a testing machine. The testing machine applies a constant rate of motion to each end of the sample of 20 inches per minute. The preferred aqueous polyurethane is commercially available from C. L. Hauthaway & Sons Corporation as Hauthane HD-4664.

As described above, the waterborne coating composition includes a water-soluble cross-linker. Preferably, this water-soluble cross-linker is an aminoplast resin that is reactive with the carboxyl groups of the aqueous polyurethane dispersion. The aminoplast resin is the reaction product of a formaldehyde and an amine selected from the group consisting of ureas, melamines, and combinations thereof. Melamine and urea are the preferred amines, but other amines may be used including, but not limited to, triazines, triazoles, diazines, guanidines, or guanamines. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that have one to six carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. The preferred water-soluble cross-linker is commercially available from Cytec Industries as Cymel® 327.

One suitable water-soluble cross-linker has a non-volatile weight percent in the range of 85 to 95 percent and a viscosity of 1,000 to 7,500 centipoise. The water-soluble cross-linker having these characteristics improves the sprayability of the waterborne coating composition. If the waterborne coating composition has too high of a viscosity, the waterborne coating composition will not be able to be applied using standard application equipment.

The waterborne coating composition may also include at least one additive. The additive is selected from the group consisting of surfactants, flow and appearance control agents, defoaming agents, and pigments. Of course, combinations of the above-referenced additives are suitable for the waterborne coating composition. The surfactants reduce the surface tension of the waterborne coating composition. Examples of suitable surfactants include BYK 345, available from Chemie, and Disparlon EXQ 200P. The flow control agents increase the sprayability of the waterborne coating composition, while the appearance control agents improve the final appearance of the waterborne coating composition. The defoaming agents improve the appearance of the waterborne coating composition by destabilizing the surface films of bubbles. The defoaming agent may also spread on the surface of these films as the bubbles form thereby breaking the bubbles. A suitable defoaming agent is Surfynol DF-37 available from Air Products Chemical. Rheology control agents may also be used to control the flow the waterborne coating composition. One suitable product may be obtained from KIA Inc., under the tradename Acrysol RM-12W.

The waterborne coating composition may also comprise at least one pigment. The pigment preferably does not react with water and/or do not dissolve in water. The pigment may consist of inorganic or organic compounds and may impart a special effect and/or color to the film of the waterborne coating composition. Special effect pigments that may be utilized include metal flake pigments, such as commercial aluminum bronzes, and also non-metallic effect pigments such as pearlescent or interference pigments.

Most paint systems use a combination of white pigments and color pigments. The most widely used white pigment is the crystal form of titanium dioxide ($TiO_2$). Other white pigments are zinc oxide (ZnO), zinc sulfide (ZnS), barium sulfate ($BaSO_4$), and lithopone. Some commonly used color pigments are copper phthalocyanine-based greens and blues, quinacridone red, iron oxide red, iron oxide yellow, dirarylide yellow, perinone orange, indanthrene blue, cromophthal red, irgazine orange, and heliogen green.

The waterborne coating composition includes a pigment-to-binder (P/B) ratio which is based upon the amount of solid pigment to the amount of binder component. It is to be understood that the amount of pigment present in the waterborne coating composition varies depending on many compositional factors including, but not limited to, a particular color family. The waterborne coating composition has a P/B ratio of 0 to 0.7. Preferably, the P/B ratio is 0 to 0.5, and more preferably 0 to 0.4. The waterborne coating composition exhibits an increased chip resistance as the P/B ratio decreases.

The waterborne coating composition is preferably applied to form the waterborne paint film on a metallic substrate such as an automobile body. However, the waterborne coating composition may be applied to other substrates without varying the scope of the subject invention. By way of example, the waterborne coating composition of the subject invention may be applied to a plastic substrate such as a bumper, mirror, or internal dashboard, of the automobile. The waterborne coating composition may also be applied to aluminum and galvanized steel and to any of the above materials after these materials are electrocoated. The substrate is for use in automotive applications because automobiles have predetermined areas, such as rocker panels and leading edges, which are more susceptible to becoming chipped and would benefit from the waterborne coating composition having improved resistance to chip.

The waterborne coating composition of the subject invention is used as a primer layer applied to an electrocoat and is also used as an anti-chip primer layer applied between the primer layer and the electrocoat. The paint system utilizing the waterborne coating composition of the subject invention produces a waterborne paint film. The waterborne paint film is produced from having the electrocoat, the waterborne coating composition as the primer layer and/or the anti-chip primer layer, and a topcoat layer. The following description illustrates the subject invention being used as a primer layer applied upon the electrocoat. The same description applies to the waterborne coating composition being used as the anti-chip primer layer with a different composition as the primer layer. The waterborne coating composition is cured to form the waterborne paint film. Preferably, the electrocoat is cured before application of the waterborne coating composition. However, the electrocoat may be cured at the same time as the primer layer of the invention in a process known as "wet-on-wet" coating. The waterborne coating composition is applied to the substrate to have a film build of from 0.5 to 5 mils. Preferably the film build is from 0.8 to 4 mils, more preferably from 1 to 3 mils. The substrate is flashed for ten minutes in ambient conditions and then flashed for ten minutes at 180° F. The substrate is then baked for thirty minutes in an oven at 300° F.

A topcoat layer is applied to the primer layer. The topcoat layer includes a basecoat layer and a clearcoat layer. The topcoat layer serves both aesthetic and functional purposes such as increasing gloss and resistance to acid-etch, respectively. The topcoat layer is applied to the primer layer and cured. The basecoat layer may contain any of the pigments discussed above. The clearcoat layer is a transparent coating that provides an attractive smooth and glossy finish to the substrate and is applied to the basecoat layer. The basecoat layer and the clearcoat layer are usually applied wet-on-wet. The layers are applied in coats separated by a flash, as described below, with a flash also between the last coat of the color composition and the first clearcoat layer. The two coating layers are then cured simultaneously. Preferably, the film build of the cured basecoat layer is 0.6 to 1.6 mils, more preferable 0.8 to 1.4 mils thick, and film build of the cured clear coat layer is 1 to 3 mils, more preferably 1.4 to 2.4 mils.

The primer layer of the subject invention and the topcoat can be applied wet-on-wet. For example, the waterborne coating composition can be applied, then the applied layer flashed, then the topcoat can be applied and flashed, then the primer and the topcoat can be cured at the same time. Again, the topcoat can include the basecoat layer and the clearcoat layer applied wet-on-wet.

It is also to be understood that different types of topcoats are compatible with the waterborne coating composition of the subject invention. These different types include, but are not limited to, one-component solvent borne clearcoats, one-component waterborne clearcoats, two-component solvent borne clearcoats, and two-component waterborne clearcoats. In the preferred embodiment, the topcoat is a crosslinking composition. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kind of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above.

Each layer can be applied to the substrate according to any of a number of techniques well known in the art. These include, for example, spray coating, dip coating, roll coating, curtain coating, and the like. The electrocoat is preferably applied by electrodeposition. For automotive applications, the waterborne coating composition of the invention and the topcoat layer or layers are preferably applied by spray coating, particularly electrostatic spray methods. Coating layers of one mil or more are typically applied in two or more coats, separated by a time sufficient to allow some of the solvent or aqueous medium to evaporate, or "flash," from the applied layer. The flash may be at ambient or elevated temperatures, for example, the flash may use radiant heat. The layers described are preferably cured with heat. Curing temperatures are preferably from 70° C. to 180° C., and particularly preferably from 170° C. to 200° C. for a composition including an unblocked acid catalyst, or from 240° C. to 325° C. for a composition including a blocked acid catalyst. Typical curing times at these temperatures range from 15 to 60 minutes, and preferably the temperature is chosen to allow a cure time of from 15 to 30 minutes. In a preferred embodiment, the coated substrate is an automotive body or part. The coats as applied can be from 0.5 mil up to 3 mils dry, and a sufficient number of coats are applied to yield the desired final coating thickness.

After the substrate has been prepared as described above, the substrate is subjected to a Gravel Chip Test. According to the Gravel Chip Test, the substrate is cooled to −20° C. for at least one hour prior to the test. The substrate is positioned in a test machine in an upright position, 90 degrees from the path of gravel. Three pints of gravel are then blown onto the substrate with an air pressure of 70 PSI. The gravel is preferably water-worn road gravel, not crushed limestone or rock, which will pass through a 5/8" space screen when grated, but will be retained on a 3/8" space screen. The gravelometer is preferably available from Q-Panel Lab Products. The substrate is then analyzed using image software and a scanner. The substrate is scanned and the image software measures the percent paint film loss from the surface of the substrate. In the preferred embodiment, the percent paint film loss described below was obtained by scanning the substrate as a black and white drawing on a HP Scanjet 4c having a resolution of 75 dpi and a contrast of 125 (on a 0 to 250 scale). The HP Scanjet 4c utilized HP DeskScan II V2.4 software to accomplish the scanning. The scanned image of the substrate was then analyzed using Visilog 5.1 software available from Noesis Vision, Inc. The analysis was preformed on a 12.5 by 6.8 cm area of the substrate. The percent paint film loss was calculated using the "Area" routine in the software. The software calculates the percent paint film loss based on the number of dark pixels versus the total number of pixels (approx. 74,000). Alternately, the substrate can be visually evaluated and measured on a scale. Of course, one skilled in the art could vary the equipment or the gravel to produce a different percent paint film loss with the waterborne coating composition of the subject invention.

The substrate, after being prepared as discussed above, produces a paint film loss of from 0.05 to 0.8 percent according to the Gravel Chip Test. The paint film loss is related to the film build of the waterborne coating composition. As the film build of the waterborne coating composition increases, the paint film loss on the substrate decreases. More specifically, the paint film loss is reduced by about half when the film build of the waterborne coating composition is doubled. Therefore, the waterborne coating composition provides improved chip resistance as compared to previously known primers, while retaining other desirable properties, such as gloss, peel, and DOI.

The following examples, illustrating the formation of the waterborne coating composition according to the subject invention and illustrating certain properties of the waterborne coating composition and of the paint film produced by the waterborne coating composition as applied onto the substrate, as presented herein, are intended to illustrate and not limit the invention.

EXAMPLES 1 & 2

The waterborne coating composition is preferably prepared in two steps. The first step is to prepare a paste having a composition shown in Table 1. The formation of the paste allows the pigments to be equally dispersed within the waterborne coating composition. The paste is prepared by mixing the aqueous polyurethane dispersion with dionized water. Then Defoamer is added to the mixture, followed by the pigments white, inert, red, black and yellow. The paste is then mixed for thirty minutes at 3,000 RPMs and ground to a paint gloss of about 50.

TABLE 1

| Component | wt (g) |
|---|---|
| Aqueous Polyurethane Dispersion (HD-4664) | 1298.99 |
| Additives | — |
| Dionized Water | 239.42 |
| Defoamer | 51.96 |
| White Pigment | 320.27 |
| Inert Pigment | 320.27 |

TABLE 1-continued

| Component | wt (g) |
|---|---|
| Red Pigment | 6.27 |
| Black Pigment | 1.79 |
| Yellow Pigment | 0.67 |
| Total | 940.65 |

The second step is to prepare the waterborne coating composition in the following manner. Under agitation, mix the paste with the additional aqueous polyurethane dispersion and the water-soluble cross-linker. Then add the surfactant, thickener, and dionized water. Sufficient dionized water is added to obtain the percent solids desired for the mixture. The relative amounts added are shown in Table 2.

TABLE 2

| Component | wt (g) |
|---|---|
| Aqueous Polyurethane Dispersion (HD-4664) | 2858.00 |
| Water-soluble Cross-Linker (CYMEL 327) | 593.75 |
| Paste (From Table 1, including HD-4664) Additives | 2239.64 |
| Dionized Water | 1141.75 |
| Surfactant | 88.10 |
| Associative Thickener | 69.22 |
| Total | 6990.46 |

The aqueous polyurethane dispersion is 50% (+/−1%) solid by weight and the water-soluble cross-linker is 90% (+/−2%) solid by weight. The binder component is the total weight of solids of the aqueous polyurethane dispersion and of the water-soluble cross linker. Using the composition listed in Tables 1 and 2, there are 2078.5 grams solids of the aqueous polyurethane dispersion and 534.38 grams solids of the water-soluble cross linker. This results in 79.55% by weight of the aqueous polyurethane dispersion and 20.45% by weight of the water-soluble cross-linker. The waterborne coating composition also has 649.27 grams by weight of pigment, which produces a P/B of 0.248.

A substrate was prepared by applying an electrocoat and spraying the substrate with the waterborne coating composition of the subject invention. The substrate was flashed for ten minutes in ambient conditions and then flashed for ten minutes at 180° F. The substrate was then baked for thirty minutes in an oven at 300° F. The substrate was then coated with a basecoat, performance white BASF Basecoat, and a clearcoat, Ureclear K BASF clearcoat.

For Example 1, one mil of the waterborne coating composition was sprayed onto the substrate and flashed and cured as described above. The substrate was then topcoated with a basecoat and a clearcoat and was flashed as described above. The Gravel Chip Test was then performed on the substrate and resulted in a paint film loss of 0.38%.

For Example 2, two mils of the waterborne coating composition were sprayed onto the substrate and flashed and cured as described above. The substrate was then topcoated with the basecoat and a clearcoat and was then flashed as described above. The Gravel Chip Test was then performed on the substrate and resulted in a paint film loss of 0.20%.

COMPARATIVE EXAMPLES 3 & 4

A comparative acrylic primer composition is preferably prepared in two steps. The first step is to prepare a paste having a composition shown in Table 3. The formation of the paste allows the pigments to be equally dispersed within the composition.

| Component | wt (g) |
|---|---|
| Polyurethane | 530.28 |
| Dionized Water | 1257.61 |
| Cross-Linker | 255.10 |
| Surfactant/Defoamer | 59.40 |
| Pigment | 822.58 |
| Total | 2924.97 |

The second step combines the paste with additional polyurethane, dionized water, water-soluble cross-linker, and additives as shown in Table 4.

TABLE 4

| Component | wt (g) |
|---|---|
| Polyurethane | 1076.63 |
| Acrylic Polymer | 688.68 |
| Dionized Water | 1461.01 |
| Associative Thickener/Defoamer | 75.57 |
| Paste | 2924.97 |
| Total | 6226.86 |

A substrate was prepared by applying an electrocoat and the acrylic primer composition set forth in Table 4. The substrate was flashed for ten minutes in ambient conditions and then flashed for ten minutes at 180° F. The substrate was then baked for thirty minutes in an oven at 300° F.

The polyurethane is 40% (+/−1%) solid by weight, the acrylic polymer is 41% (+/−1%) solid by weight, and the cross-linker is 98% (+/−2%) solid by weight. The binder component is the total weight of solids of the polyurethane, acrylic polymer and the cross linker. Using the composition listed in Tables 3 and 4, there are 642.76 grams solids of the polyurethane, 282.36 grams solid of the acrylic polymer, and 249.99 grams solids of the cross linker. This results in 63.0% by weight of the polyurethane, 27.0% by weight of the acrylic polymer, and 10.0% by weight of the cross-linker. The coating composition also has 822.58 grams by weight of pigment, which produces a P/B of 0.70.

For Example 3, one mil of the acrylic primer composition was sprayed onto the substrate and flashed and cured as described above. The substrate was then topcoated with a basecoat and a clearcoat and was flashed as described above. The Gravel Chip Test was then performed on the substrate and resulted in a paint film loss of 0.54%.

For Example 4, two mils of the acrylic primer composition were sprayed onto the substrate and flashed and cured as described above. The substrate was then topcoated with the basecoat and a clearcoat and was then flashed as described above. The Gravel Chip Test was then performed on the substrate and resulted in a paint film loss of 0.36%.

As the film build increased in each of the Examples, the amount of paint loss decreased. However, the aqueous polyurethane dispersion in Examples 1 and 2 decreased the amount of paint loss by 47% by increasing the film build by one mil. Whereas the acrylic primer composition in Examples 3 and 4 decreased the amount of paint loss by 33% by increasing the film build by one mil. The waterborne coating composition of the subject invention when sprayed at 2 mils, reduced the percent paint film between Examples 2 and 4 by 44%.

COMPARATIVE EXAMPLES 5 & 6

A comparative polyester/acrylic primer composition is commercially available from BASF Corporation as Smoke U28AW031. The smoke primer contains melamine formaldehyde, polyester, and acrylic. The smoke primer was applied to the substrate and then coated with a basecoat, performance white BASF Basecoat, and a clearcoat, Ureclear K BASF clearcoat.

The smoke primer was applied at a thickness of 2 mils and produced a paint film loss of 0.50%. Compared to Example 2 utilizing the waterborne coating composition of the subject invention, the percentage of paint loss was reduced by 60%.

What is claimed is:

1. An acrylic-free, waterborne coating composition for producing a waterborne paint film having improved chip resistance on a substrate, said waterborne coating composition comprising:
    (a) an aqueous polyurethane dispersion substantially free from co-solvents and having at least one carboxyl group, said aqueous polyurethane dispersion having a glass transition temperature from 0° C. or less; and
    (b) a water-soluble cross-linker reactive with said carboxyl groups;
    wherein said aqueous polyurethane dispersion and said water-soluble cross-linker form a binder component of said waterborne coating composition, said binder component comprising from 60 to 90% by weight of said aqueous polyurethane dispersion based on 100% by weight of said binder component and from 10 to 40% by weight of said water-soluble cross-linker based on 100% by weight of said binder component.

2. An acrylic-free, waterborne coating composition as set forth in claim 1 wherein said glass transition temperature is from −80° C. to −20° C.

3. An acrylic-free, waterborne coating composition as set forth in claim 1 wherein said aqueous polyurethane dispersion is a reaction product of a polyol and a polyisocyanate selected from the group consisting of aliphatic polyisocyanates, alicyclic polyisocyanate, and combinations thereof.

4. An acrylic-free, waterborne coating composition as set forth in claim 3 wherein said polyol is selected from the group consisting of 1,6-hexanediol, 1-hexen-6-ol, 1-dodecanol, and combinations thereof.

5. An acrylic-free, waterborne coating composition as set forth in claim 1 wherein said aqueous polyurethane dispersion includes a number-average molecular weight of from 1,000 to 40,000.

6. An acrylic-free, waterborne coating composition as set forth in claim 1 wherein said aqueous polyurethane dispersion includes an acid number of from 5 to 25 mg KOH/g.

7. An acrylic-free, waterborne coating composition as set forth in claim 1 wherein said aqueous polyurethane dispersion includes a softening point from 275° C. to 345° C.

8. An acrylic-free, waterborne coating composition as set forth in claim 1 wherein said aqueous polyurethane dispersion includes an ultimate tensile strength of greater than 6000 PSI.

9. An acrylic-free, waterborne coating composition as set forth in claim 1 wherein said water-soluble cross-linker is an aminoplast resin.

10. An acrylic-free, waterborne coating composition as set forth in claim 9 wherein said aminoplast resin is the reaction product of a formaldehyde and an amine selected from the group consisting of ureas, melamines, and combinations thereof.

11. An acrylic-free, waterborne coating composition as set forth in claim 1 wherein said water-soluble cross-linker includes a non-volatile weight percent in the range of 85 to 95 percent.

12. An acrylic-free, waterborne coating composition as set forth in claim 1 wherein said water-soluble cross-linker includes a viscosity of 1,000 to 7,500 centipoise.

13. An acrylic-free, waterborne coating composition as set forth in claim 1 further comprising at least one pigment and said waterborne coating composition includes a pigment-to-binder ratio of equal to or less than 0.7.

14. An acrylic-free, waterborne coating composition as set forth in claim 1 further comprising at least one additive selected from the group consisting of pigments, surfactants, flow and appearance control agents, defoaming agents, and combinations thereof.

15. An acrylic-free, waterborne coating composition as set forth in claim 1 having a film build of from 0.5 to 5.0 mils of the waterborne paint film.

16. A substrate including a waterborne paint film having improved chip resistance wherein the waterborne paint film is produced by a waterborne coating composition comprising:
    (a) an aqueous polyurethane dispersion substantially free from co-solvents, said aqueous polyurethane dispersion having a glass transition temperature from 0° C. or less and having carboxyl groups; and
    (b) a water-soluble cross-linker reactive with said carboxyl groups;
    wherein said aqueous polyurethane dispersion and said water-soluble cross-linker form a binder component of said waterborne coating composition, said binder composition comprising from 60 to 90% by weight of said polyurethane dispersion and from 10 to 40% by weight of said water-soluble cross-linker.

17. A substrate as set forth in claim 16 having a film build of the waterborne paint film of from 0.5 to 5.0 mils.

18. A substrate as set forth in claim 17 having a paint film loss of from 0.05 to 0.8 percent according to a Gravel Chip Test at said film build of the waterborne paint film.

19. A layered paint system comprising:
    a vehicle;
    a waterborne primer layer for application across said vehicle, said waterborne primer layer comprising;
    (a) an aqueous polyurethane dispersion substantially free from co-solvents, said aqueous polyurethane dispersion having a glass transition temperature from 0° C. or less and having carboxyl groups; and
    (b) a water-soluble cross-linker reactive with said carboxyl groups;
    wherein said aqueous polyurethane dispersion and said water-soluble cross-linker form a binder component of said waterborne primer layer, said binder composition comprising from 60 to 90% by weight of said aqueous polyurethane dispersion and from 10 to 40% by weight of said water-soluble cross-linker.

20. A layered paint system as set forth in claim 19 further comprising a waterborne anti-chip primer layer applied between said vehicle and said waterborne primer layer at predetermined areas of said vehicle; said waterborne anti-chip primer layer comprising:
    (a) an aqueous polyurethane dispersion substantially free from co-solvents, said aqueous polyurethane dispersion having a glass transition temperature from 0° C. or less and having carboxyl groups; and (b) a water-soluble cross-linker reactive with said carboxyl groups;

wherein said aqueous polyurethane dispersion and said water-soluble cross-linker form a binder component of said waterborne anti-chip primer layer, said binder composition comprising from 60 to 90% by weight of said aqueous polyurethane dispersion and from 10 to 40% by weight of said water-soluble cross-linker.

21. A layered paint system as set forth in claim 20 wherein said waterborne anti-chip primer layer has a film build of from 0.5 to 5.0 mils 22. A layered paint system as set forth in claim 21 further comprising a topcoat layer applied to said waterborne primer layer.

23. A layered paint system as set forth in claim 22 wherein said topcoat layer further comprises a basecoat layer having a film build of from 0.6 to 1.6 mils.

24. A layered paint system as set forth in claim 23 wherein said topcoat layer further comprises a clearcoat layer having a film build of from 1.4 to 2.4 mils.

25. A layered paint system as set forth in claim 24 wherein said waterborne primer layer has a film build of from 0.5 to 5.0 mils.

26. A layered paint system as set forth in claim 25 having a paint film loss of from 0.05 to 0.8 percent according to a Gravel Chip Test.

27. An acrylic-free, waterborne coating composition for producing a waterborne paint film having improved chip resistance on a substrate, said waterborne coating composition comprising:

(a) an aqueous polyurethane dispersion substantially free from co-solvents and having at least one carboxyl group, said aqueous polyurethane dispersion having a glass transition temperature from 0° C. or less; and (b) a water-soluble cross-linker reactive with said carboxyl groups;

wherein said aqueous polyurethane dispersion and said water-soluble cross-linker form a binder component of said waterborne coating composition, said binder component comprising from 60 to 90% by weight of said aqueous polyurethane dispersion based on 100% by weight of said binder component and from 10 to 40% by weight of said water-soluble cross-linker based on 100% by weight of said binder component; and wherein said water coating composition produces the waterborne paint film to have a paint film loss of from 0.05 to 0.8 percent according to a Gravel Chip Test.

28. An acrylic-free, waterborne coating composition as set forth in claim 27 wherein said glass transition temperature is from −80° C. to −20° C.

29. An acrylic-free, waterborne coating composition as set forth in claim 27 wherein said aqueous polyurethane dispersion is a reaction product of a polyol and a polyisocyanate selected from the group consisting of aliphatic polyisocyanates, alicyclic polyisocyanate, and combinations thereof.

30. An acrylic-free, waterborne coating composition as set forth in claim 29 wherein said polyol is selected from the group consisting of 1,6-hexanediol, 1-hexen-6-ol, 1-dodecanol, and combinations thereof.

31. An acrylic-free, waterborne coating composition as set forth in claim 27 wherein said aqueous polyurethane dispersion includes a number-average molecular weight of from 1,000 to 40,000.

32. An acrylic-free, waterborne coating composition as set forth in claim 27 wherein said water-soluble cross-linker is an aminoplast resin.

33. An acrylic-free, waterborne coating composition as set forth in claim 27 wherein said aminoplast resin is the reaction product of a formaldehyde and an amine selected from the group consisting of ureas, melamines, and combinations thereof.

34. An acrylic-free, waterborne coating composition as set forth in claim 27 further comprising at least one pigment and said waterborne coating composition includes a pigment-to-binder ratio of equal to or less than 0.7.

35. An acrylic-free, waterborne coating composition as set forth in claim 27 further comprising at least one additive selected from the group consisting of pigments, surfactants, flow and appearance control agents, defoaming agents, and combinations thereof.

36. An acrylic-free, waterborne coating composition as set forth in claim 27 having a film build of from 0.5 to 5.0 mils of the waterborne paint film.

37. An acrylic-free, waterborne coating composition for producing a waterborne paint film having improved chip resistance on a substrate, said waterborne coating composition comprising:

(a) an aqueous polyurethane dispersion substantially free from co-solvents and having at least one carboxyl group, said aqueous polyurethane dispersion having a glass transition temperature from 0° C. or less; and (b) a water-soluble cross-linker reactive with said carboxyl groups;

wherein said aqueous polyurethane dispersion and said water-soluble cross-linker form a binder component of said waterborne coating composition, said binder component comprising from 60 to 90% by weight of said aqueous polyurethane dispersion based on 100% by weight of said binder component and from 10 to 40% by weight of said water-soluble cross-linker based on 100% by weight of said binder component; and wherein said water coating composition has a film build of from 0.5 to 5.0 mils of the waterborne paint film and a paint film loss of from 0.05 to 0.8 percent according to a Gravel Chip Test.

38. An acrylic-free, waterborne coating composition as set forth in claim 37 wherein said paint film loss decreases as said film build increases.

39. An acrylic-free, waterborne coating composition as set forth in claim 37 wherein said glass transition temperature is from −80° C. to −20° C.

40. An acrylic-free, waterborne coating composition as set forth in claim 37 wherein said aqueous polyurethane dispersion is a reaction product of a polyol and a polyisocyanate selected from the group consisting of aliphatic polyisocyanates, alicyclic polyisocyanate, and combinations thereof.

41. An acrylic-free, waterborne coating composition as set forth in claim 40 wherein said polyol is selected from the group consisting of 1,6-hexanediol, 1-hexen-6-ol, 1-dodecanol, and combinations thereof.

42. An acrylic-free, waterborne coating composition as set forth in claim 37 wherein said aqueous polyurethane dispersion includes a number-average molecular weight of from 1,000 to 40,000.

43. An acrylic-free, waterborne coating composition as set forth in claim 37 wherein said water-soluble cross-linker is an aminoplast resin.

44. An acrylic-free, waterborne coating composition as set forth in claim 37 wherein said aminoplast resin is the reaction product of a formaldehyde and an amine selected from the group consisting of ureas, melamines, and combinations thereof.

45. An acrylic-free, waterborne coating composition as set forth in claim 37 further comprising at least one pigment and said waterborne coating composition includes a pigment-to-binder ratio of equal to or less than 0.7.

46. An acrylic-free, waterborne coating composition as set forth in claim 37 further comprising at least one additive selected from the group consisting of pigments, surfactants, flow and appearance control agents, defoaming agents, and combinations thereof.

* * * * *